(12) United States Patent
Liu et al.

(10) Patent No.: US 11,570,040 B2
(45) Date of Patent: *Jan. 31, 2023

(54) AUTOMATIC SETUP OF FAILURE DETECTION SESSIONS

(71) Applicant: Nicira, Inc., Palo Alto, CA (US)

(72) Inventors: Jin Liu, Beijing (CN); Hua Wang, Beijing (CN); Ziyou Wang, Beijing (CN); Bolt Zhang, Beijing (CN); Pradeep Singh, Palo Alto, CA (US); Anupam Chanda, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/945,912

(22) Filed: Aug. 2, 2020

(65) Prior Publication Data
US 2020/0366550 A1   Nov. 19, 2020

Related U.S. Application Data

(63) Continuation of application No. 16/015,051, filed on Jun. 21, 2018, now Pat. No. 10,771,320, which is a continuation of application No. 15/146,879, filed on May 4, 2016, now Pat. No. 10,009,218.

(60) Provisional application No. 62/317,273, filed on Apr. 1, 2016.

(51) Int. Cl.
*H04L 41/0677* (2022.01)
*H04L 49/55* (2022.01)
*H04L 12/18* (2006.01)
*H04L 12/46* (2006.01)

(52) U.S. Cl.
CPC .......... *H04L 41/0677* (2013.01); *H04L 12/18* (2013.01); *H04L 12/1863* (2013.01); *H04L 12/4633* (2013.01); *H04L 49/555* (2013.01)

(58) Field of Classification Search
CPC . H04L 45/566; H04L 41/0654; H04L 67/327; H04L 67/146; H04L 67/2814
See application file for complete search history.

(56) References Cited

U.S. PATENT DOCUMENTS 10,009,218 B2   6/2018 Liu et al.
2013/0058255 A1* 3/2013 Casado ................ H04L 47/783
370/255

(Continued)

*Primary Examiner* — Iqbal Zaidi
(74) *Attorney, Agent, or Firm* — Adeli LLP

(57) ABSTRACT

For a network with host machines that are hosting virtual machines, a method for facilitating BUM (broadcast, unknown unicast, and multicast) traffic between a hardware switch (e.g., ToR switch) and the host machines is provided. The network has a set of host machines configured as a cluster of replicators for replicating BUM traffic from the hardware switch to the host machines. A set of network controllers establishes failure-detection tunnels for links between the hardware switch and the replicator cluster. The replicator cluster informs the set of controllers of a change in the membership of the replicator cluster to initiate an update to the active failure-detection sessions. The set of network controllers communicates with the replicator cluster and a ToR switch to establish bidirectional forwarding detection (BFD) sessions between one or more replicator nodes in the replicator cluster and the ToR switch.

7 Claims, 8 Drawing Sheets

(56) References Cited

U.S. PATENT DOCUMENTS

2014/0351432 A1\* 11/2014 Koponen ............ H04L 43/0823
709/224
2017/0026263 A1\* 1/2017 Gell .................... G06F 16/1844
2017/0288953 A1 10/2017 Liu et al.
2018/0302271 A1 10/2018 Liu et al.

\* cited by examiner

AUTOMATIC SETUP OF FAILURE DETECTION SESSIONS

CLAIM OF BENEFIT TO PRIOR APPLICATIONS

This application is a continuation application of U.S. patent application Ser. No. 16/015,051, filed Jun. 21, 2018, now published as U.S. Patent Publication 2018/0302271. U.S. patent application Ser. No. 16/015,051 is a continuation application of U.S. patent application Ser. No. 15/146,879, now issued as U.S. Pat. No. 10,009,218. U.S. patent application Ser. No. 15/146,879 claims the benefit of U.S. Provisional Patent Application 62/317,273, filed Apr. 1, 2016. U.S. patent application Ser. No. 16/015,051, now published as U.S. Patent Publication 2018/0302271, and U.S. patent application Ser. No. 15/146,879, now issued as U.S. Pat. No. 10,009,218, are incorporated herein by reference.

BACKGROUND

In networked systems there is a need to detect failure of links between network elements (e.g., end machines, routers, switches, other forwarding elements, etc.). For the purposes of the present application a link will be understood to be any means by which information can be passed between network elements. Numerous techniques and protocols for verifying the functionality of network links exist. Some of these techniques and protocols involve network entities repeatedly sending messages to each other across connections in order to demonstrate their vitality. One such protocol is bidirectional forwarding detection (BFD). BFD is a network protocol that provides low-overhead failure detection of link failures even on media that does not support failure detection of any kind. BFD sessions are established between two endpoints over a particular link.

A drawback of some of these techniques and protocols is the lack of a discovery mechanism for establishing the failure-detection session. This lack of a discovery mechanism causes an administrator to explicitly configure a failure-detection session between endpoints. Such configuration is time-intensive and error-prone. As the number of devices and links grows, manual configuration of failure-detection sessions quickly becomes unmanageable. For example, for large networks or datacenters experiencing frequent link failures and additions and removals of network elements, constant updates to failure-detection sessions would be required. Such constant updates monopolize administrators' time and introduce significant numbers of errors. Thus, there is a need to manage failure-detection sessions (e.g., BFD sessions) without having the user configure each failure-detection session as it is established or removed (torn down).

SUMMARY

For a network with host machines that are hosting virtual machines, some embodiments provide a method for facilitating BUM (broadcast, unknown unicast, and multicast) traffic between a hardware switch (e.g., ToR switch) and the host machines. The network has a set of host machines configured as a cluster of replicators for replicating BUM traffic from the hardware switch to the host machines, and a set of network controllers establishes failure-detection tunnels for links between the hardware switch and the replicator cluster. In some embodiments, the replicator cluster informs the set of controllers of a change in the membership of the replicator cluster to initiate an update to the active failure-detection sessions. In some embodiments, the set of network controllers communicates with the replicator cluster and a ToR switch to establish bidirectional forwarding detection (BFD) sessions between one or more replicator nodes in the replicator cluster and the ToR switch. To establish a BFD session between the ToR switch and a replicator node, the set of network controllers in some embodiments waits for the ToR switch to establish a first unidirectional tunnel from the ToR switch to the replicator node before establishing a second unidirectional tunnel from the replicator node to the ToR switch.

In some embodiments, the set of network controllers receives state information about the replicator cluster that includes at least tunnel endpoint information for a newly-added replicator. The set of network controllers then derives replicator cluster information from the state information and sends the derived replicator cluster information to a ToR switch. The ToR switch would use the replicator cluster information to determine if a BFD session should be established with the newly-added replicator node based on at least a consideration of the availability of tunneling resources of the ToR switch. If a BFD session is to be set up, the ToR switch would use the replicator cluster information to establish a first unidirectional tunnel between it and the replicator node and send unidirectional tunnel information regarding the first unidirectional tunnel to the set of network controllers. The set of network controllers then derives unidirectional tunnel endpoint information from the unidirectional tunnel information of the first unidirectional tunnel to establish a second unidirectional tunnel from the replicator node to the ToR switch. A BFD session may then be established over the two unidirectional tunnels.

Some embodiments provide a method for tearing down an existing BFD session. The network controller receives state information about the replicator cluster that includes at least tunnel endpoint information for a recently-removed replicator. The set of network controllers then derives replicator cluster information from the state information and sends the derived replicator cluster information to a ToR switch. The ToR switch would use the replicator cluster information to determine if an existing BFD session should be torn down based on at least a consideration of the availability of tunneling resources of the ToR switch. If the BFD session is to be torn down, the ToR switch would use the replicator cluster information to tear down a first unidirectional tunnel between it and the replicator node. The set of network controllers then receives unidirectional tunnel information of the torn down first unidirectional tunnel between the ToR switch and the replicator node. The set of network controllers then derives unidirectional tunnel endpoint information from the unidirectional tunnel information of the torn down first unidirectional tunnel to tear down a second unidirectional tunnel from the replicator node to the ToR switch.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
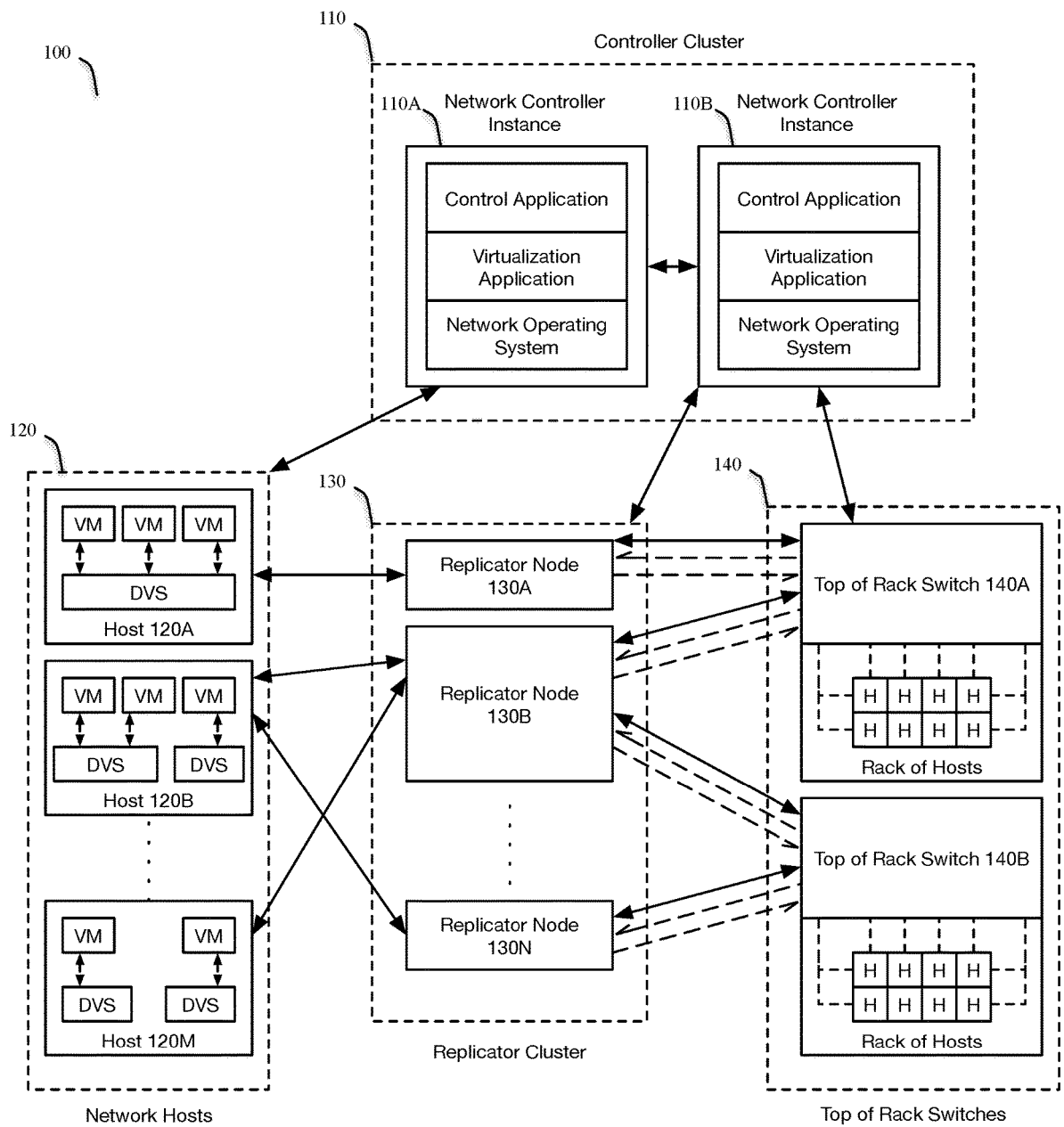
FIG. 1 illustrates a network that includes hosts, replicator nodes in a replicator cluster and hardware forwarding elements connected by a plurality of links.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method that configures failure-detection sessions (at least in part by configuring or establishing failure-detection tunnels) for links between network elements (or network entities) in a network. The network may be configured, among other configurations, as described in U.S. Patent Publication 2015/0100675 and U.S. Pat. No. 9,043,452, which are hereby incorporated by reference.

In different embodiments, the failure-detection session takes different forms. However, in general, the failure-detection session includes the transmission of some form of connection validating control signals (also referred to as network validating control signals below) over a connection in some embodiments. The failure-detection sessions can be established on any type of connection capable of transmitting network validating control signals. For instance, the failure-detection sessions can be established on any telecommunication connection. Failure-detection sessions can also be established over physical wires, wireless connections, tunnels, VPNs, Bluetooth connections, and other such comparable telecommunication systems or protocols (e.g., connections along various communication layers of the OSI 7 layer model).

In some embodiments, the connection validating control signals are control packets transmitted in a bidirectional forwarding detection session (BFD session). A BFD session is established on a network connection between two network entities. The BFD session transmits control packets between the two network entities over the network connection. When a first entity no longer receives control packets from a second network entity, the first network entity can conclude that the second network entity or the connection to the second network entity has failed. In this way, the BFD session allows network entities to have a way of determining when they should commence failover processes.

In establishing or tearing down a BFD session, a three-way handshake is implemented to ensure that both systems are aware of a state change to the BFD session (e.g., going from up to down). During this three-way handshake and subsequent exchanges of packets the end machines (e.g., ToR switches or host machines) may specify such things as a desired minimum transmission (TX) interval, a required minimum receive (RX) interval, a session state (e.g., Up, Down, AdminDown, Init), a mode of operation (e.g., asynchronous or demand), and whether an echo function should be enabled.

Methods and systems for regulating transmission of connection validating control signals for a failure-detection session are described in U.S. Patent Publication 2015/0085655, which is hereby incorporated by reference.

In the present application, forwarding elements (which may include L2 switching elements and L3 routing elements) and end machines may be referred to as network elements. In addition, a network that is managed by one or more network controllers may be referred to as a managed network in the present application. In some embodiments, the managed network includes only managed forwarding elements (e.g., forwarding elements that are controlled by one or more network controllers) while, in other embodiments, the managed network includes managed forwarding elements as well as unmanaged forwarding elements (e.g., forwarding elements that are not controlled by a network controller). In some embodiments, a managed forwarding element is also known as a software forwarding element, a hypervisor, or virtualization software. The managed forwarding element operating in a host machine allows the host machine to host one or more virtual machines and to implement software switches or logical forwarding elements.

Some embodiments provide a network controller cluster that communicates with a wide range of devices (e.g., third-party hardware), ranging from switches to appliances such as firewalls, load balancers, etc. The network controller cluster communicates with such devices to connect them to its managed virtual networks, which are defined by the network controller cluster through software forwarding elements and/or software appliances. In some embodiments, each device communicating with the network controller cluster has a database server that is controlled through a protocol such as OVSDB. The network controller of some embodiments can be implemented in software as an instance of an application running on a host machine.

The controller cluster of some embodiments defines a logical datapath set based on user input that specifies a network switching element. A logical datapath set is a set of network datapaths through managed forwarding elements that are used to implement the user-specified network switching or routing elements. In other words, the logical datapath set is a logical representation of the network's specified packet-forwarding characteristics and behaviors. A logical datapath set may also be referred to as a logical forwarding element. A managed forwarding element may be a hardware forwarding element, a software forwarding element, or a virtual forwarding element. Thus, one of ordinary skill in the art will realize that the reference to a physical component is not meant to refer to an actual physical component, but rather the reference is meant to distinguish from logical components (e.g., a logical forwarding element, a logical port, etc.).

The one or more network controllers (also referred to as, network controller instances, controllers, or controller instances) in a controller cluster can define virtual (or logical) networks spanning software and hardware forwarding elements. Logical networks may be implemented using, for example, virtual local area networks (VLANs) or virtual extensible local area networks (VXLANs).

Network elements used to implement VXLAN may have a port (e.g., a VMkernel port) which is used as a VXLAN tunnel endpoint (VTEP). A VTEP will have an internet protocol (IP) address to which packets will be addressed when using VXLAN. In some embodiments, a failure-detection session may be configured to use the VTEP of a network element as an endpoint of a failure-detection tunnel. In some embodiments, the VTEP will be responsible for encapsulating and decapsulating packets going out over and coming in from an external network respectively.

In some embodiments, a host machine operating a managed forwarding element is configured as a replicator node and may be part of a set of replicator nodes that forms a replicator cluster. In some embodiments, a replicator cluster may facilitate the forwarding of broadcast, unknown unicast, and multicast (BUM) traffic between a set of host computers hosting virtual machines and a set of hardware forwarding elements (e.g., ToR switches), as described in U.S. Patent Publication 2015/0100675. In some embodiments, the replicator cluster will inform the set of controller computers of a change in the membership of the replicator cluster to initiate an update to the active failure-detection sessions. In some embodiments this change may be the addition of a replicator node to the replicator cluster or the change may be the removal of a replicator node from the replicator cluster.

FIG. 1 conceptually illustrates a network architecture 100 that allows BUM traffic between a ToR switch and a set of host machines. The network architecture 100 includes a controller cluster 110 that comprises network controller instances 110A and 110B, a set of network hosts 120, replicator cluster 130, a set of top of rack (ToR) switches 140.

As shown in FIG. 1, the controller cluster 110 manages the managed forwarding elements in hosts 120A-M in the set of network hosts 120, replicator nodes 130A-N, and the top of rack switches 140A and 140B. Controller instance 110A is shown controlling hosts 120A-M in the set of network hosts 120, and controller instance 110B is shown controlling replicator nodes 130A-N in the replicator cluster 130 and top of rack switches 140A-B in the set of top of rack switches 140. However, in some embodiments a single controller controls all the network elements illustrated in FIG. 1, and in some other embodiments, different controllers control different physical network elements (e.g., host machines, ToR switches) or different logical network elements (e.g., logical forwarding elements, etc.).

As will be discussed in FIG. 2, controller cluster 110 facilitates the establishment of failure-detection sessions between replicator nodes in the replicator cluster 130 and top of rack switches in the set of top of rack switches 140.

As shown in FIG. 1, a particular host in the set of network hosts 120 establishes links with a particular replicator node or a set of replicator nodes in replicator cluster 130. In some embodiments, these links are used to facilitate the forwarding of broadcast, unknown unicast, and multicast (BUM) traffic between the host and the hosts in the rack of hosts accessible through a top of rack switch in the set of top of rack switches 140.

In addition to communicating through the replicator nodes 130A-130N in the replicator cluster 130, in some embodiments hosts 120A-M may have links to the ToR switches in the set of ToR switches 140 that do not rely on the replicator nodes 130A-130N (not shown). In some embodiments, a particular host may establish a single link with a single replicator node in the replicator cluster 130 (e.g., host 120A in FIG. 1 connected to replicator node 130A). In some embodiments, a host machine may establish a plurality of links with replicator nodes in the replicator cluster 130, each link to a separate replicator node (e.g., host 120B in FIG. 1 connected to replicator nodes 130B and 130N). In some embodiments, a particular replicator node may be connected to a plurality hosts in the set of network hosts (e.g., replicator node 130B which is connected to hosts 120A and 120M). In other embodiments there may be any combination of the above network architecture.

A host machine in the set of network host machines 120 in some embodiments host a plurality of virtual machines which communicate with other machines (virtual or otherwise) by means of software switches (e.g., a distributed virtual switch or an open vswitch) also running on the hosts. As shown in FIG. 1, a particular host may have a plurality of software switches. Additionally, multiple virtual machines may connect to a single software switch or may each be connected to a single software switch.

As shown in FIG. 1, in some embodiments, a replicator node in replicator cluster 130 is used to facilitate BUM traffic between hosts in the set of network hosts 120 and the hosts in the racks of hosts accessible through ToR switches 140A and 140B in the set of ToR switches 140. In some embodiments, replicator nodes 130A-130N in replicator cluster 130 establish bidirectional links (shown in solid lines) with hosts 120A-M and top of rack switches 140A and 140B in order to facilitate BUM traffic. As shown in FIG. 1, links are established from a set of replicators in replicator cluster 130 to a particular ToR switch 140A. As shown in FIG. 1, in some embodiments additional pairs of unidirectional links are established between replicator nodes in the set of replicator nodes 130 and the ToR switches in the set of ToR switches 140. In some embodiments, the pairs of unidirectional links are established according to the process described by reference to FIG. 2 below and are used to implement a failure-detection protocol (e.g., bidirectional forwarding detection (BFD) protocol).

As shown in FIG. 1, in some embodiments top of rack switches 140A and 140B are used by multiple hosts in the rack of hosts to communicate with other hosts in the network. The hosts in the rack of hosts may also host virtual machines and software switches as do the hosts in the set of network hosts 120. A particular top of rack switch may be a hardware forwarding element with limited resources for establishing links and limited ability to be programmed to implement logical forwarding elements. In some embodiments, the limitation on the number of links that can be established will cause a top of rack switch to determine that a new failure-detection session should not be established with a particular replicator node in the set of replicator nodes 130. Additionally, the limited number of links that can be established may cause a ToR switch to determine that an existing failure-detection tunnel should be torn down. The limited programmability of the ToR switches in some embodiments requires the use of replicator nodes to forward BUM traffic towards the destination machine.

Figure 2:
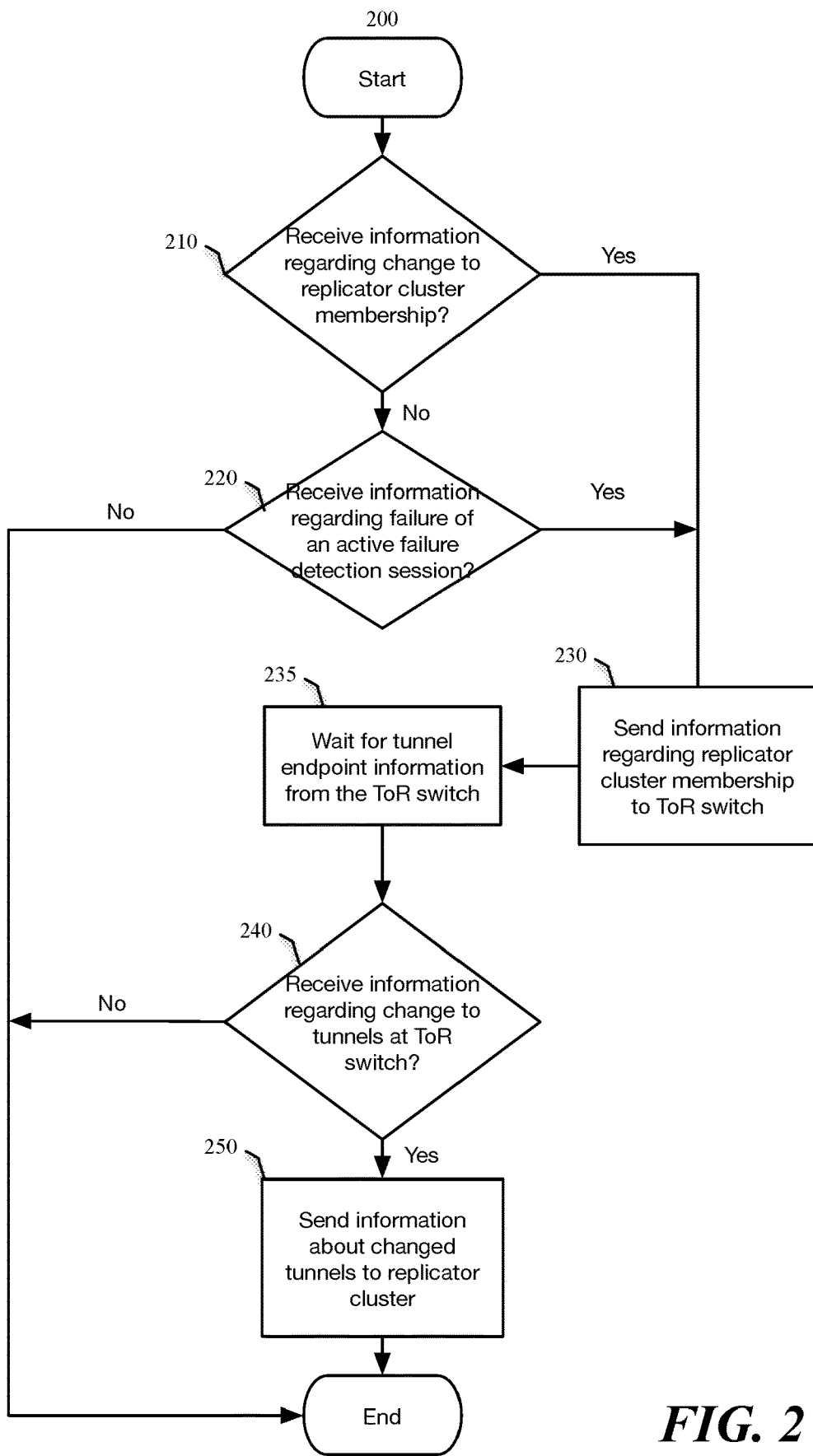
FIG. 2 conceptually illustrates a process of some embodiments for establishing failure-detection sessions between replicator nodes in a replicator cluster and a hardware forwarding element.

FIG. 2 conceptually illustrates a process 200 that some embodiments use to manage failure-detection tunnels between a hardware forwarding element and a set of managed forwarding elements (MFEs) serving as a replicator cluster. Throughout the description of FIG. 2, references will be made to elements of FIG. 1 as non-limiting examples of embodiments of network elements implementing the process 200. FIGS. 3-7 are simplified representations of the network environment that will also be used as non-limiting examples of network elements implementing the process 200. A person of ordinary skill in the art would appreciate that the process 200 may also be used to establish failure-detection tunnels between any two managed network elements.

In some embodiments, a set of network controllers (also called network controller instances or controllers) would broker an exchange of information necessary to perform the process 200. For example, FIG. 1 conceptually illustrates network controller instances 110A and 110B, in controller cluster 110 which may be used to implement process 200.

Figure 3:
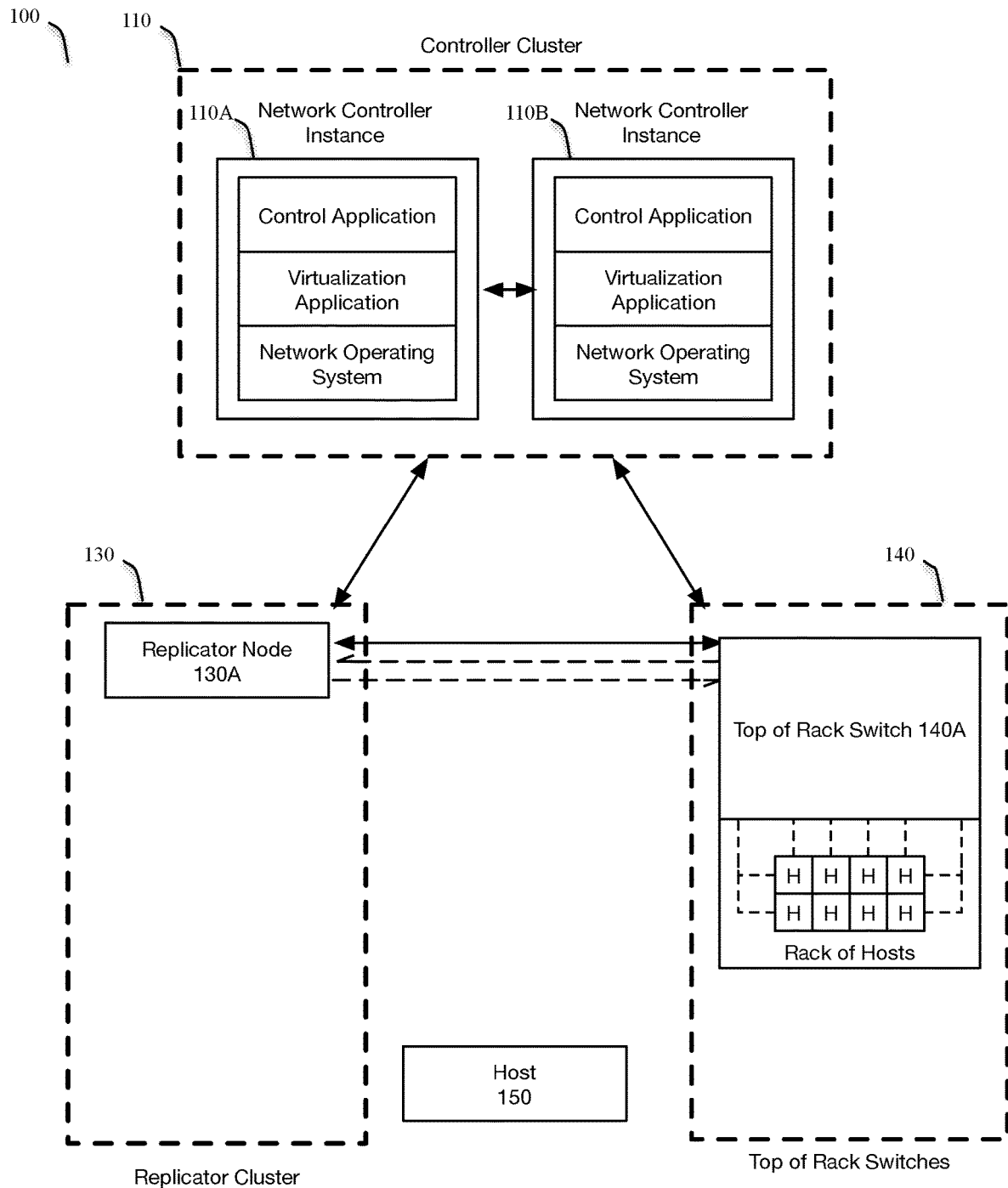
FIG. 3 illustrates a network that includes a controller cluster controlling a replicator cluster and a hardware forwarding element, the software and hardware forwarding elements connected by a link for network traffic and a parallel failure-detection tunnel.

Prior to the start of the process 200, failure-detection tunnels may already exist between a hardware forwarding element (e.g., ToR switch 140A or 140B) and a replicator node or a set of replicator nodes. FIG. 3 conceptually illustrates an existing failure-detection tunnel between replicator node 130A and ToR switch 140A. The existing failure-detection tunnel is depicted as unidirectional dashed lines, while a bidirectional link for forwarding BUM traffic is depicted as a solid bidirectional arrow.

As shown in FIG. 2, the process 200 begins by determining (at 210) if it has received state information from the replicator cluster regarding a change in the membership of the replicator cluster (e.g., when a replicator node joins or leaves a replicator cluster 130). The state information may include any combination of information about the membership of the replicator cluster (e.g., 130), information about a newly added replicator node, information about a newly removed replicator node, the IP addresses of the various replicator nodes in the replicator cluster, the IP addresses of the VTEPs of the various replicator nodes in the replicator cluster, or any other state information about the replicator nodes, replicator cluster, or existing links. If the process 200 has not received state information regarding a change in the membership of the replicator cluster, the process proceeds to 220. If the process 200 has received state information regarding a change in the membership of the replicator cluster, the process transitions to 230.

At 220, the process determines if it has received information regarding a failure of an active failure detection session. If so, the process proceeds to 230. If the process has not received information regarding a failure of an active failure detection session, the process 200 ends.

At 0230, the process sends information regarding the replicator cluster membership to the hardware forwarding element (e.g., ToR switch 140A). The replicator cluster membership information sent to the hardware forwarding element may be any of the state information sent to the controller cluster or information derived from the state information received from the replicator cluster. The process then proceeds to 235.

At 235, the process waits for tunnel endpoint information from a hardware forwarding element. In some embodiments, the hardware forwarding element has less resources for establishing failure detection sessions than the replicator cluster. The process therefore let the hardware forwarding element decide whether to establish a new unidirectional tunnels from the hardware forwarding element to a replicator node, or whether to tear down an existing unidirectional tunnels from the hardware forwarding element to a replicator node. This determination may be based on any combination of the replicator cluster membership information (e.g., information about the removal or addition of a replicator node), the existing tunnels, and the utilization of the tunnel resources of the hardware forwarding element. Once the hardware forwarding element has decided to establish or tear down a unidirectional channel to the replicator cluster, it would send tunnel endpoint information to the process (at the network controller)

The process then determines (at 240) whether the hardware switch has made changes to its unidirectional tunnels, i.e., whether the hardware switch has established a new unidirectional channel or torn down an existing unidirectional channel. In some embodiments, if a new tunnel is established or an existing tunnel is removed by the hardware forwarding element, the process would receives tunnel endpoint information from the hardware forwarding element. The tunnel endpoint information received from a hardware forwarding element may include state information for all existing tunnels terminating at the hardware forwarding element or only those tunnels for which there has been a change. The state information may include identifying information for the tunnels established or torn down such as IP address of the hardware forwarding element, an IP address for a VTEP on the hardware forwarding element that serves as a tunnel endpoint, or any other information the network controller or replicator nodes may use to identify a corresponding unidirectional tunnel. If the process has received tunnel endpoint information from the hardware forwarding element, the process proceeds to 250. If the process has not received any tunnel endpoint information from the hardware forwarding element (e.g., after a predetermined time-out interval), the process 200 ends.

At 250, the process (at 250) sends tunnel state information to the replicator cluster. The tunnel state information may be any of the tunnel endpoint information or any information derived from the tunnel endpoint information. The tunnel state information can then be used by replicator nodes in the replicator cluster to establish or tear down tunnels corresponding to the tunnels established or torn down, respectively. If the process has successfully established a pair of unidirectional tunnels between the a replicator node and the hardware forwarding element, the established pair of unidirectional tunnels may then be used to implement a bidirectional forwarding detection session. The process 200 then ends.

Operations of a controller (e.g, the controller cluster 110 of FIG. 1) implementing the process 200 to manage failure-detection tunnels will now be described by reference to FIGS. 4-7.

Figure 4:
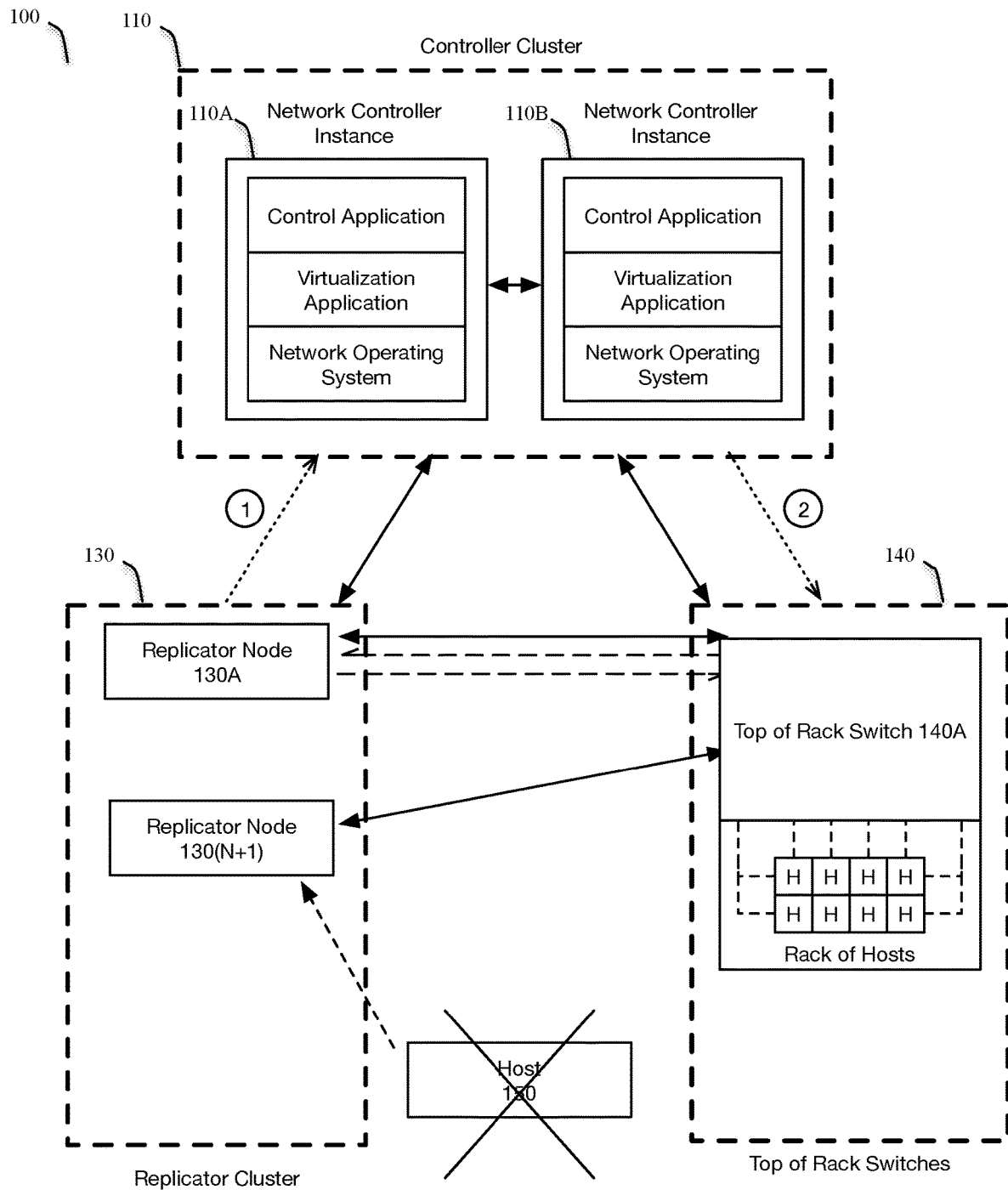
FIG. 4 illustrates adding a replicator node to a replicator cluster.

FIG. 4 illustrates a new replicator node being added to a replicator cluster 130 and the controller 110 facilitating the establishment of a failure-detection tunnel from the new added replicator node to the ToR switch 140A. As illustrated, the replicator cluster 130 is adding a new replicator node 130(N+1). The replicator cluster 130 in turn sends state information to the controller 110 (depicted as a dotted line marked with a circled number 1, which corresponds to the operations 210 of the process 200), informing the controller of the added new replicator node.

In some embodiments, the information sent to the controller cluster 110 may include any combination of information about the membership of the replicator cluster 130, information about a newly added replicator node, information about a newly removed replicator node, the IP addresses of the various replicator nodes in the replicator cluster 130, the IP addresses of the VTEPs of the various replicator nodes in the replicator cluster 130, or any other state information about the replicator nodes, replicator cluster 130, or existing links.

FIG. 4 further illustrates the controller cluster 110 sending the replicator cluster membership information to the ToR switch 140A (depicted as a dotted line marked with a circled number 2, which corresponds to the operation 230 of the process 200).

Figure 5:
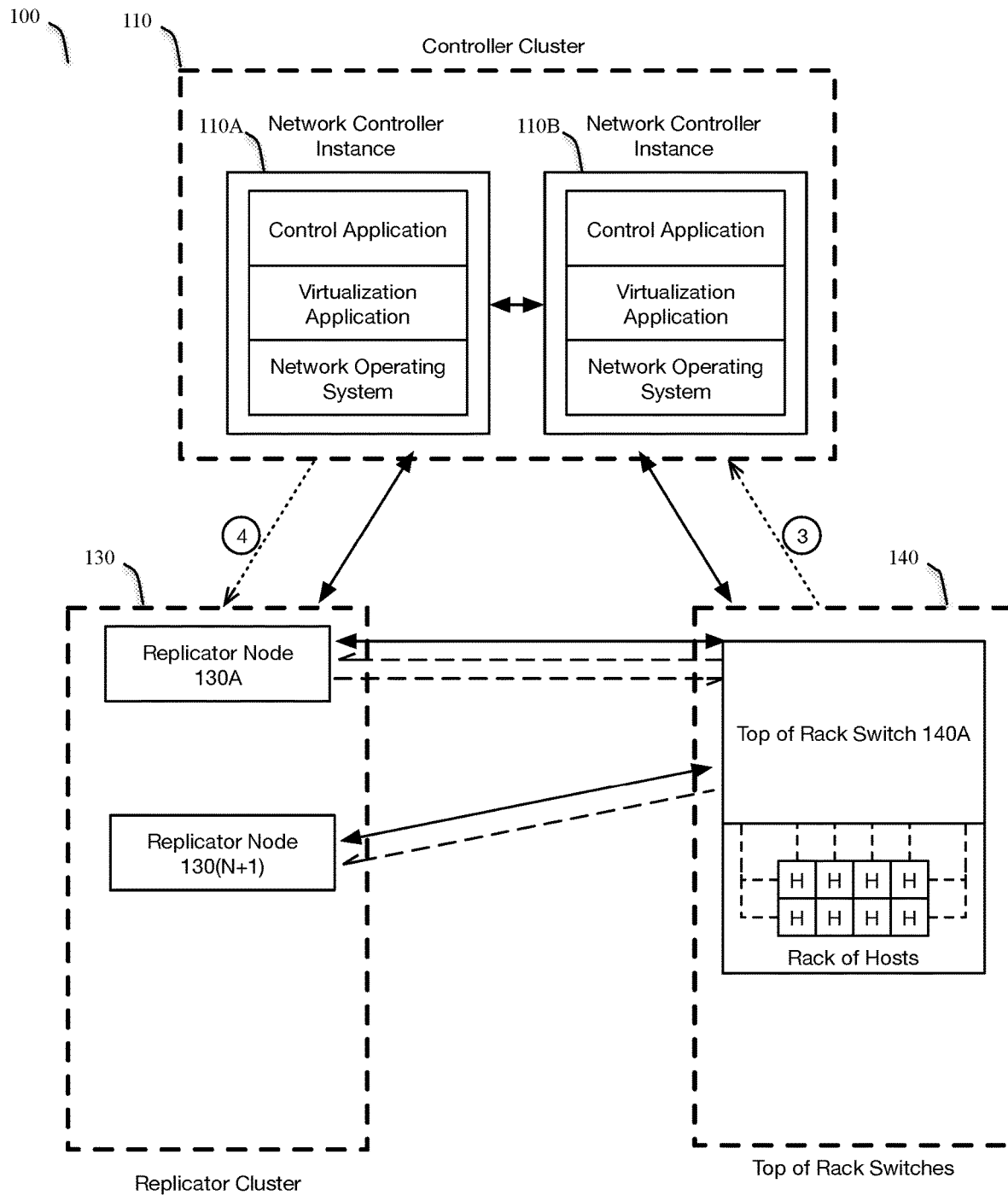
FIG. 5 illustrates the establishment of a unidirectional tunnel between a hardware forwarding element and a newly-added replicator node in a replicator cluster.
Figure 6:
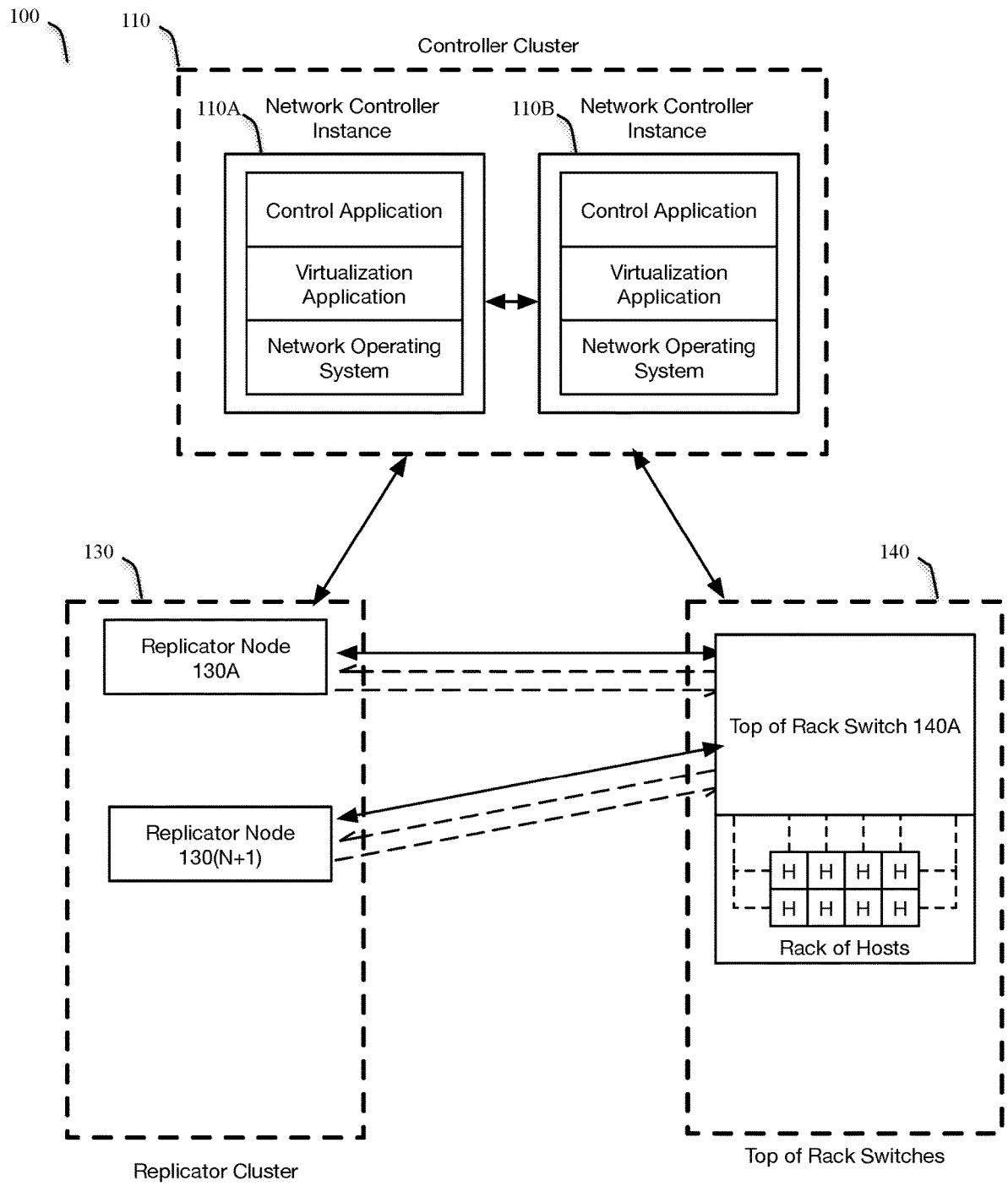
FIG. 6 illustrates the establishment of a unidirectional tunnel between a replicator node in a replicator cluster and a hardware forwarding element.

FIG. 5 illustrates a ToR switch establishing a unidirectional tunnel with the newly added replicator node in the replicator cluster for a failure-detection session. Specifically, the figure illustrates the ToR switch 140A having established a unidirectional tunnel with the newly-added replicator node 130(N+1) and sends the tunnel endpoint information to the controller 110 regarding the newly established unidirectional tunnel (depicted as a dotted line marked with a circled number 3, which corresponds to the operation 240 of the process 200). The figure also shows the controller 110 sending tunnel state information to replicator cluster 130 (depicted as dotted line marked with a circled number 4, which corresponds to the operation 250 of the process 200). This tunnel state information is used by the replicator cluster 130 to establish a unidirectional tunnel from replicator node 130(N+1) to ToR switch 140A FIG. 6 illustrates a fully established pair of corresponding unidirectional tunnels between replicator node 130(N+1) and ToR switch 140A that can be used to implement a bidrectional forwarding-detection session (e.g., a BFD session).

Figure 7:
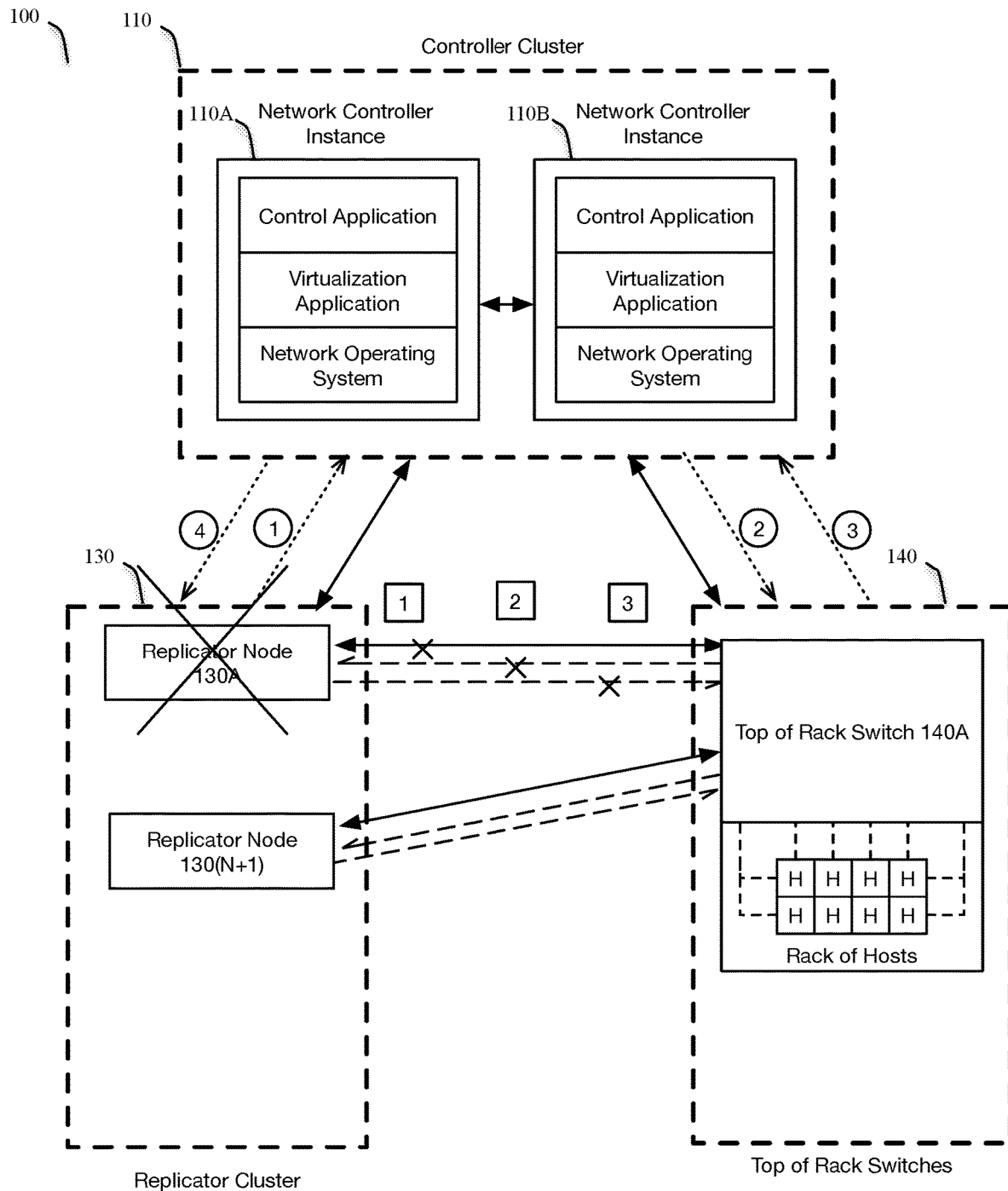
FIG. 7 illustrates the tearing down of a set of connections between a replicator node in a replicator cluster and a hardware forwarding element.

FIG. 7 illustrates the removal of a host machine from a replicator cluster and the controller facilitating the tearing down of corresponding unidirectional tunnels. The figure depicts the removal of a replicator node 130A from replicator cluster 130 and the removal of the BUM traffic link (marked with a number 1 enclosed in a square). As illustrated, the controller 110 receives state information regarding the removal of the replicator node 130A from the replicator cluster 130 (depicted as a dotted line marked with a circled number 1, which corresponds to the operation 210 of the process 200). The controller 110 then sends the replicator cluster membership information reflecting the removal of the replicator node 130A to ToR switch 140 (depiected as a dotted line marked with a circled number 2, which corresponds to the operation 230 of the process 200.)

Upon receiving the updated replicator cluster membership information, the ToR switch removes the unidirectional tunnel between itself and the replicator node 130A (depicted by the boxed number 2 above the crossed out unidirectional tunnel from the ToR switch 140A to the replicator node 130A.) The ToR switch 140A then sends the controller cluster 110 tunnel endpoint information regarding the removed unidirectional tunnel (depicted as a dotted line marked with a circled number 3, which corresponds to the operation 240 of the process 0200). The controller cluster 110 then sends tunnel state information to the replicator cluster 130 (depicted as a dotted line marked with a circled number 4, which corresponds to operation 250 of the process 200). Based on the sent tunnel state information, the replicator cluster 130 tears down the corresponding unidirectional tunnel from replicator cluster 130A to ToR switch 140 (depicted by the boxed number 3 above the crossed out unidirectional tunnel from the replicator node 130A to the ToR switch 140A). At this point the failure-detection tunnel is completely torn down.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
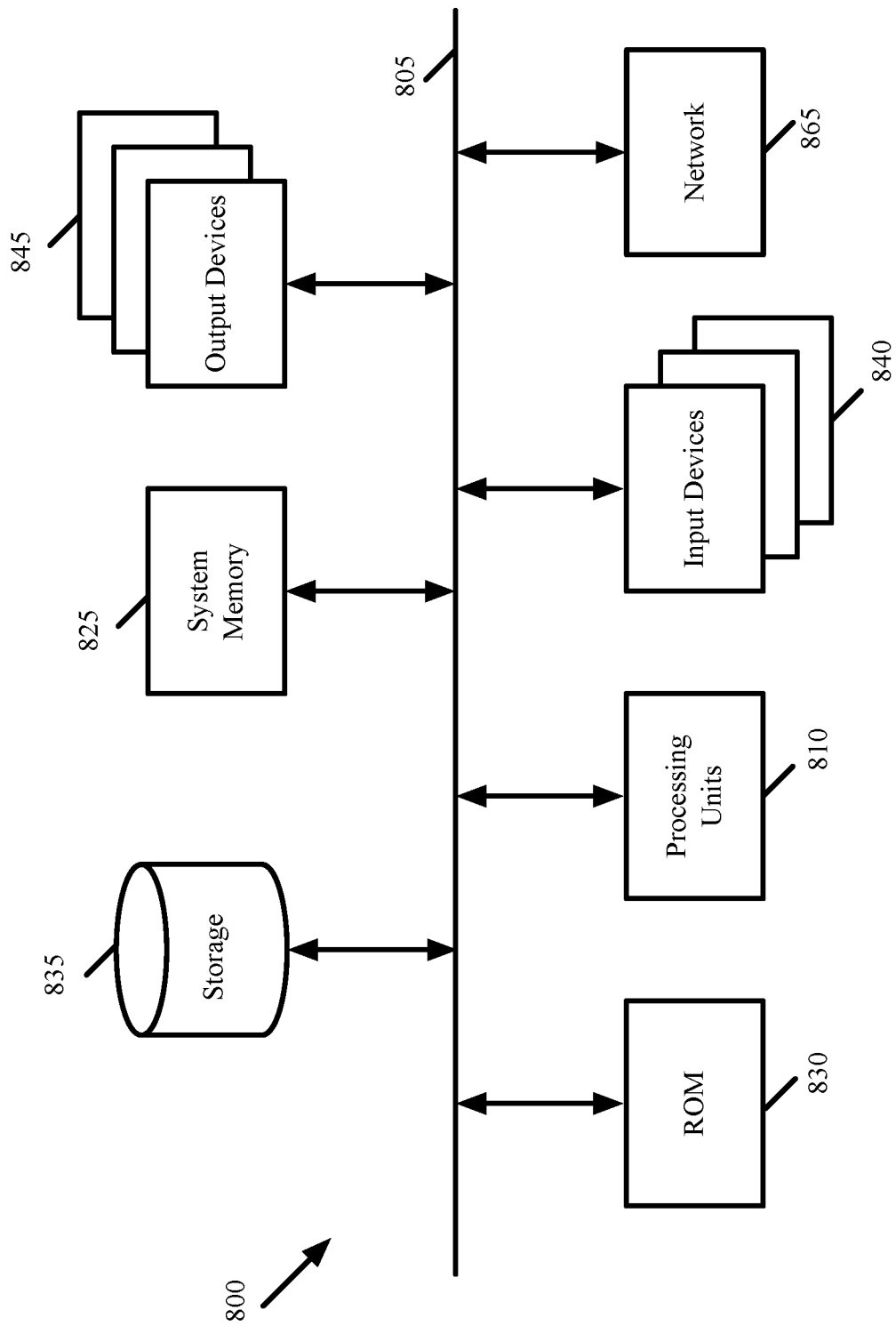
FIG. 8 illustrates an electronic system with which some embodiments of the invention are implemented.

FIG. 8 conceptually illustrates an electronic system 800 with which some embodiments of the invention are implemented. The electronic system 800 can be used to execute any of the control, virtualization, or operating system applications described above. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, FIG. 2 conceptually illustrates a process. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A system comprising:
    a first set of host computers, each host computer hosting a set of virtual machines;
    a hardware forwarding element;
    a second set of host computers for facilitating broadcast, unknown unicast, and multicast (BUM) network traffic between the hardware forwarding element and the first set of host computers; and
    a set of network controllers for establishing failure-detection tunnels between the hardware forwarding element and the second set of host computers, wherein the set of network controllers initiates an update to a set of active failure-detection sessions over the established failure-detection tunnels due to a change to a state of the second set of host computers,
    wherein the network controller set establishes the failure-detection tunnels by informing the hardware forwarding element of a current state of the second set of host computers for the hardware forwarding element to use to determine whether a failure-detection tunnel should be established.

2. The system of claim 1, wherein the change to the state of the second set of host computers comprises a failure detected by a failure detection session in the set of active failure-detection sessions.

3. The system of claim 1, wherein the change to the state of the second set of host computers comprises a change to a membership of the second set of hosts.

4. The system of claim 1, wherein at least one active failure-detection session in the set of active failure detection sessions is a bidirectional forwarding detection (BFD) session.

5. The system of claim 1, wherein in response to a message from the network controller set, the hardware forwarding element establishes a tunnel between the hardware forwarding element and a host computer in the second set of host computers.

6. A system comprising:
    a first set of host computers, each host computer hosting a set of virtual machines;
    a hardware forwarding element;

a second set of host computers for facilitating broadcast, unknown unicast, and multicast (BUM) network traffic between the hardware forwarding element and the first set of host computers; and a set of network controllers for establishing failure-detection tunnels between the hardware forwarding element and the second set of host computers, wherein the set of network controllers initiates an update to a set of active failure-detection sessions over the established failure-detection tunnels due to a change to a state of the second set of host computers, wherein a particular host computer in the second set of host computers and the hardware forwarding element exchange information through a failure-detection tunnel established between the particular host computer and the hardware forwarding element in order to detect failures in the connection between the hardware forwarding element and the particular host computer.

7. A system comprising:

a first set of host computers, each host computer hosting a set of virtual machines;

a hardware forwarding element;

a second set of host computers for facilitating broadcast, unknown unicast, and multicast (BUM) network traffic between the hardware forwarding element and the first set of host computers; and a set of network controllers for establishing failure-detection tunnels between the hardware forwarding element and the second set of host computers, wherein the set of network controllers initiates an update to a set of active failure-detection sessions over the established failure-detection tunnels due to a change to a state of the second set of host computers, wherein a particular host computer in the second set of host computers and the hardware forwarding element exchange bidirectional forwarding detection (BFD) session messages through a failure-detection tunnel in order to detect failures in the connection between the hardware forwarding element and the particular host computer.

\* \* \* \* \*